R. N. MILET.
MANURE SPREADER.
APPLICATION FILED OCT. 30, 1913.

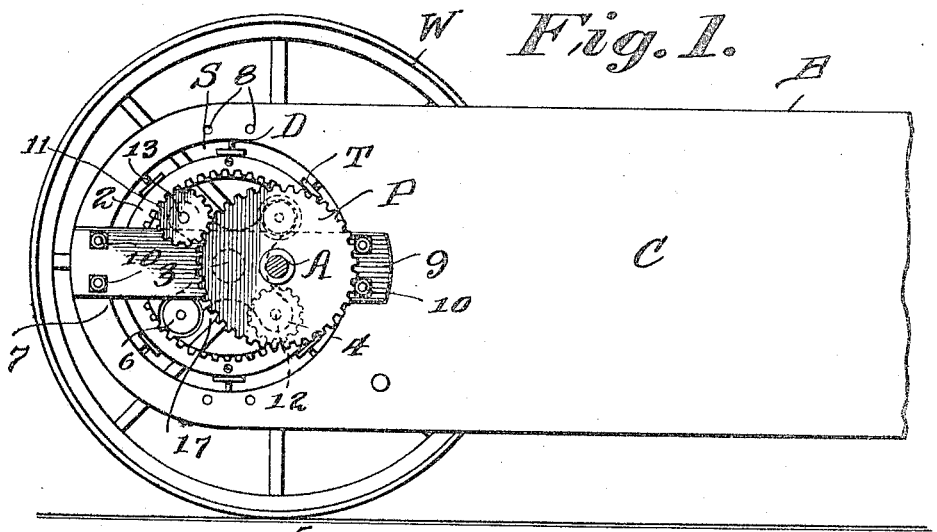
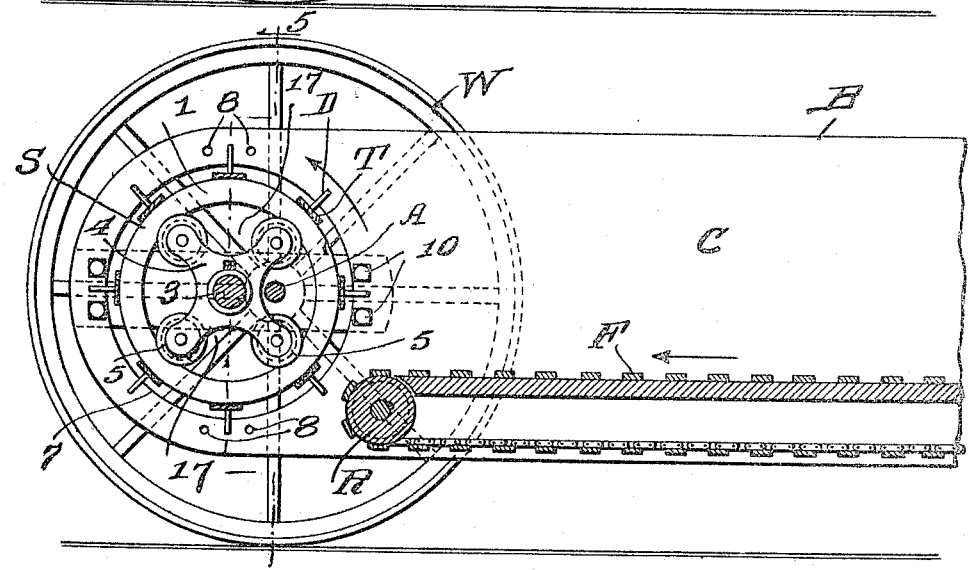

1,247,703.

Patented Nov. 27, 1917.
4 SHEETS—SHEET 2.

Witnesses
H. N. Lybrand
S. Jay Feller

Inventor
Richard N. Miles
By H. H. Bliss
Attorney

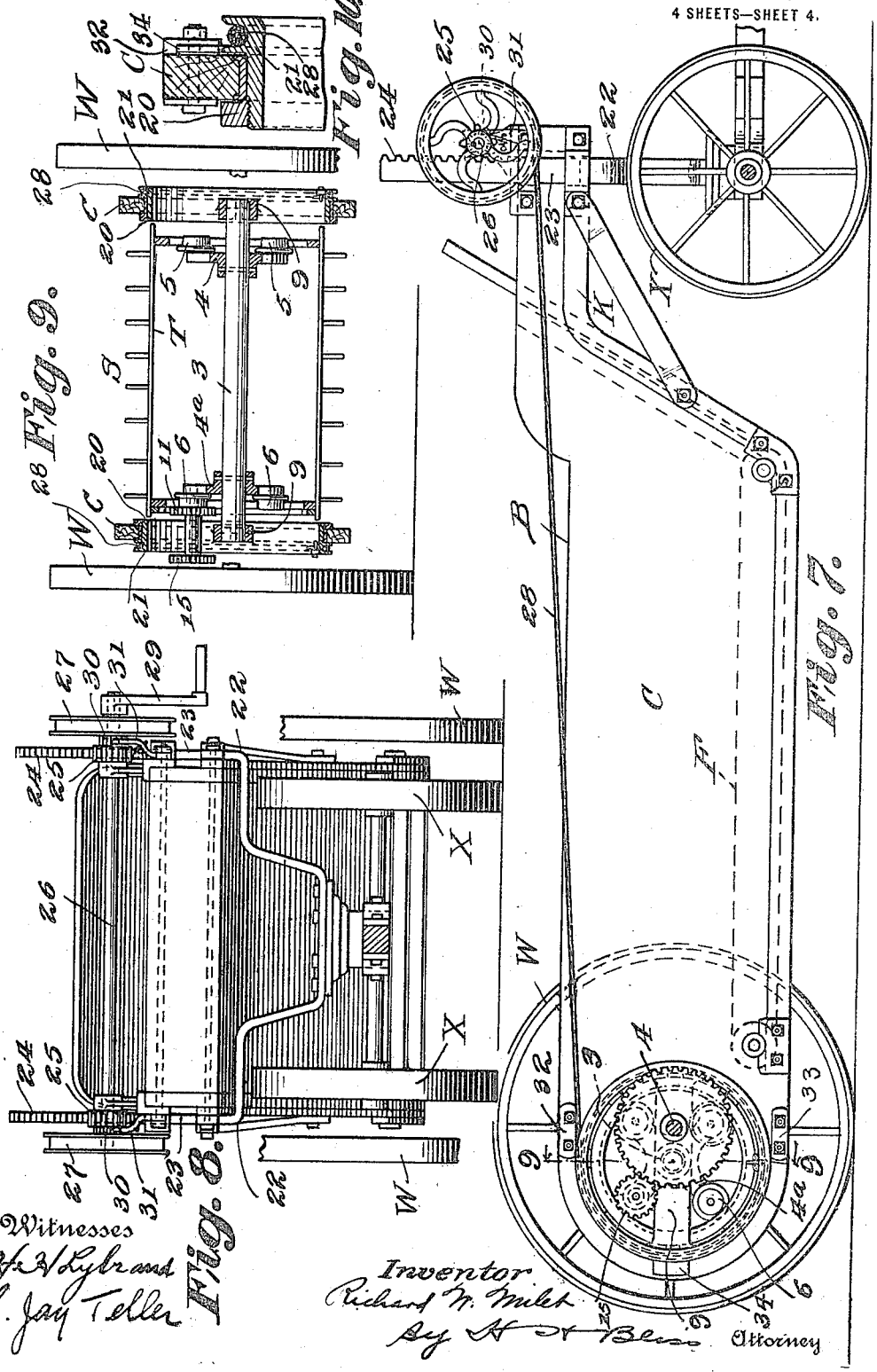

UNITED STATES PATENT OFFICE.

RICHARD N. MILET, OF KOKOMO, INDIANA.

MANURE-SPREADER.

1,247,703.  Specification of Letters Patent.  Patented Nov. 27, 1917.

Application filed October 30, 1913. Serial No. 798,304.

*To all whom it may concern:*

Be it known that I, RICHARD N. MILET, citizen of the United States, residing at Kokomo, in the county of Howard and State of Indiana, have invented certain new and useful Improvements in Manure-Spreaders, of which the following is a specification, reference being had therein to the accompanying drawing.

This invention relates to manure or fertilizer spreaders, and particularly to those which spread the manure or fertilizer by means of a rotating beater drum.

Among the objects of the invention is to construct the principal parts employed in these spreaders in such way that; 1st, the positions of the vehicle body, the feeding apron, and the beater or distributer, separately or jointly, can be adjusted to either of several positions relatively to the wheels; 2nd, the length of the wheel base can be varied to meet varying circumstances; and, 3rd, the beater can be rotated by power transmitting parts connected thereto in a novel manner for the purpose of making it relatively stable and more durable.

Of the drawings—

Figure 1 is a side elevation of some of the parts at the rear of a machine embodying my improvements, the near ground wheel being removed;

Fig. 2 is a central, vertical longitudinal section;

Fig. 7 is a side elevation of a spreader embodying my improvements in a modified form;

Fig. 8 is a front view of the spreader shown in Fig. 7; and

Fig. 9 is a fragmentary sectional view taken along the line 9—9 of Fig. 7.

Fig. 10 is a section detail.

The body part of the vehicle, as shown in Figs. 1 to 6, is indicated by B. It comprises vertical side walls or boards C, a front end wall, and a load supporting bottom, the latter, in the mechanism shown, comprising a platform E and an endless belt or conveyer F (mounted on rollers R). The belt or conveyer serves as a carrier or feeder for carrying the load backward toward the beater.

The side parts of the body are connected together and braced by suitable devices in any well known way. Sills, (not shown) preferably of angle metal, extend from the rear end of the body to the front, being secured to the lower parts of the side walls and adapted to stiffen and support them.

The rear end of the body part is supported on the rear axle A, the ground wheels W being connected to the latter. The front part of the body can be supported in any suitable way. I prefer a mounting comprising one or more front wheels (not shown in Figs. 1 to 6) arranged relatively near the central, vertical, longitudinal plane of the machine, together with an upwardly arched section of the body frame which extends from the level of the sills at the bottom of the sideboards to horizontal lines well above the top of the front wheel or wheels.

The rear end of the body, as above noted, rests upon the rear axle. Between them are interposed adjustable bearings which permit the body and the parts attached thereto to be adjusted to either of several positions on longitudinal lines, and to either of several positions on vertical lines. This can be accomplished in either of several ways. Two are selected for illustration.

In Figs. 1 to 6 devices are shown that comprise bearing bars or plates 9 which are secured to the body part and are provided with hub-like bearings at 18 in which the axle A is mounted. The bearing bars or plates 9 can be secured to the body in either of several positions differing from each other relatively, and consequently the body can be elevated or lowered in relation to the axle and the ground, or can be moved forward or backward in relation to the axle.

Figure 3:
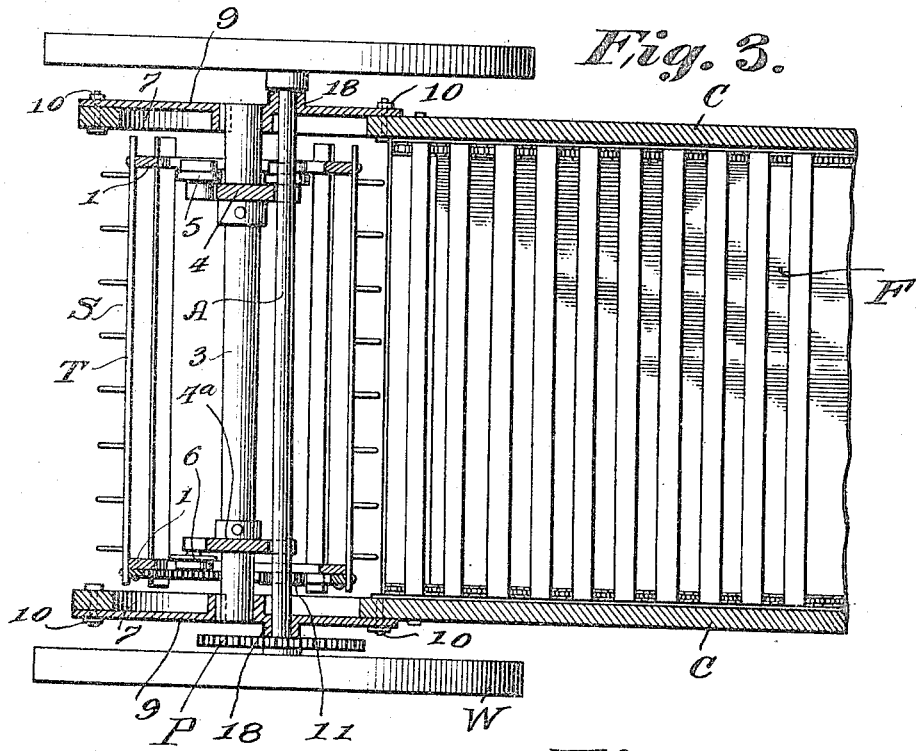
Fig. 3 is a plan view, parts being shown in section.
Figure 4:
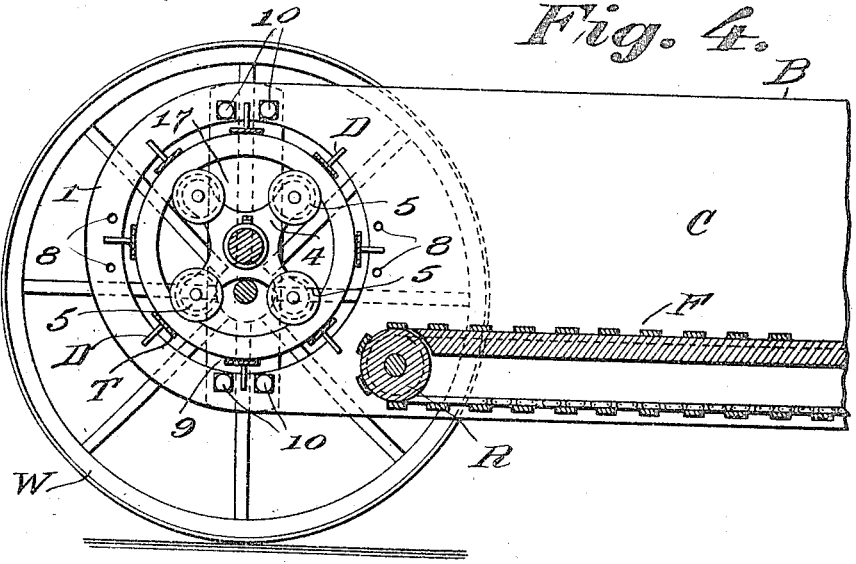
Fig. 4 is a central, vertical, longitudinal section showing the parts in another possible adjustment.
Figure 5:
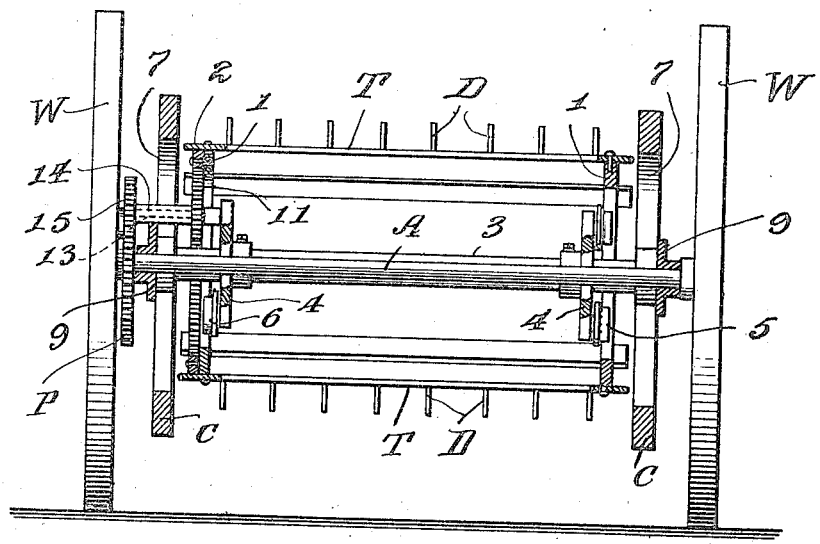
Fig. 5 is a vertical transverse section on the line 5—5 of Fig. 2.
Figure 6:
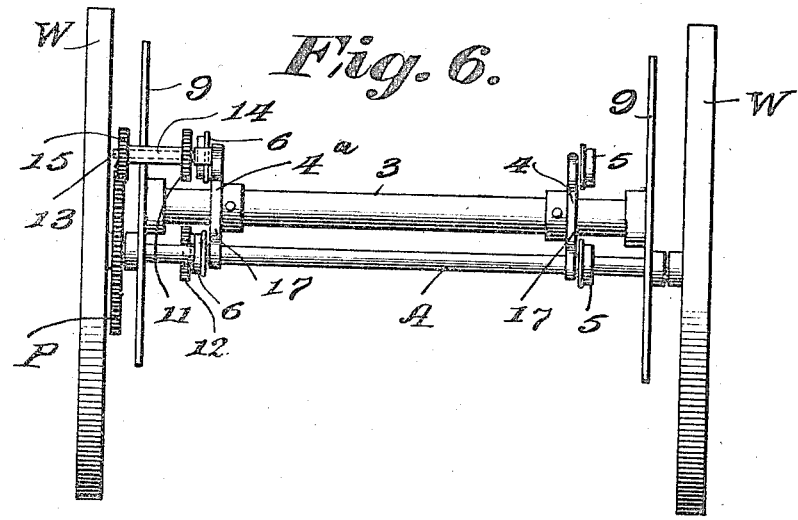
Fig. 6 is a plan view with the vehicle body and the beater removed.

Two of the positions of adjustment for the bearing bars 9 are shown in the drawings, as will be seen upon a comparison of Figs. 2 and 4. The bars 9 are secured in either of their positions by means of bolts 10 passing through bolt apertures 8. Any desired number of these apertures may be formed so that the bars or plates 9 can be placed in either of several positions.

The beater is indicated as an entirety by

S. As shown, it is formed of two ring plates 1, 1 with cross connecting bars T. These bars carry fingers D, formed and secured in any preferred way. The end head rings 1, 1 rest upon rollers or anti-friction wheels 5, 6 some at each end of the beater, there being in each set a suitable number of the rollers. The rollers are carried by spiders 4 and 4a, having radiating arms and intervening recesses 17. They are rigidly secured to the non-rotary shaft or bar 3, which is formed integrally with, or is secured to, the bearing bars or plates 9.

In the construction shown in Figs. 1 to 6 of the drawings the spider 4 is provided with four of the anti-friction beater supporting wheels 5, the spider 4a carrying but two similar wheels 6, the other two arms of this spider being utilized to support some of the power transmitting parts, as will be described. The shaft or supporting bar 3 is at the axis of the beater and is situated eccentrically in relation to the axle A, the latter lying within the periphery of the cylinder generated by the beater. The fingers D of the distributer or beater engage with the material at points in front of the axle, carry it backward over the top of the latter and deliver it to the ground.

It will be seen that the positions of the parts at the axis of the beater and the positions of those at the axis of the rear wheels are governed by the position of the bearing bars 9; and consequently, if these bars are turned around the axis of the rear wheels they will carry with them the beater supporting devices, and the beater itself can be bodily thrown up or down, and forward or backward.

I prefer to have the same means which vary the positions of the beater also available for varying the positions of the body and of the feeding apron F; but in this respect there can be modifications.

The traction of the rear wheels is utilized to rotate the beater and any well known or preferred power transmitting devices can be interposed between the wheels or the axle, on the one hand, and the beater, on the other.

A simple transmitting mechanism is shown in the drawings, it consisting of a spur gear wheel P rigid with one of the ground wheels W or with the axle, an internally geared wheel or ring 2 (secured to one end of the beater) and suitable intermediate transmission gears. As shown, the latter consists of a spur pinion 15 meshing with the prime drive wheel P, shaft 13, in a bearing 14, and toothed pinion 11 meshing with the internal gear 2. Diametrically opposite to the gear pinion 11 is an idler pinion 12, also meshing with the ring gear 2. The shafts of the gears 11 and 12 are supported on two of the arms of the spider 4a.

Any desired speed of rotation can be given to the beater by using suitable gearing of dimensions and ratios such as will impart the speed wanted.

When the parts referred to are made and related in the way described it will be seen that a number of them are situated outside of the side wall or board C of the body, and a number of them inside; and also that some of them lie on transverse lines which are eccentric to the axle A. Consequently, to permit their being turned (during adjustment) around the axle, I provide transverse passageways through or in the planes of the side walls C. As shown, the side walls are extended so as to lie partly above and partly below and behind the axle. That is to say, the passages 7 are apertures surrounded by the material of the body. This material at the rear ends of the sides can be metal secured to the forward portions which can be of wood.

However, such large apertures or passages through the side walls are not essential, if the power transmitting parts, the mountings, and the adjusting devices are suitably constructed.

When having in mind typical spreaders of three earlier sorts, the improvements embodied in mine will be readily appreciated.

In one of these earlier classes each mechanism was provided with a relatively elevated apron or feeder situated in planes high enough to have the entire load carried backward on horizontal lines above the axle and to points behind it. The beater was also situated behind the axle and generally above it. It was supported upon the side walls of the body part and mounted either upon bearing brackets secured directly to the side boards or upon brackets extending up from the light frame pieces at the bottoms of these boards. The disadvantages incident to structures of this type have been long recognized, particularly this; that the beater exerts great strains and stresses upon the frame and upon the walls of the body because of the heavy work which it performs while rapidly revolving, and the walls and frame parts not being able to withstand these strains, rapidly deteriorate.

Again, the beater being remote from the axis of the ground wheels, an elongated train of heavy gear wheels is necessary to transmit the rotary motion from the latter to the former, or else chain gearing is required, and the latter has been generally employed for this purpose.

And further, the machines of this class (having the aprons or feeding devices in relatively high planes,) have made it necessary for the workmen, when loading the body, to lift the forkfulls of the material to high points in order to get them over the side walls.

The machines of the second class were designed for the purpose of overcoming the objection last described. It was proposed to arrange the feeding apron in low planes relatively to the ground surface so that the machine could be more easily loaded. To attain this, the axle element was bent downward at points inside of the ground wheels, the cross connecting part being arranged on transverse lines much lower than the wheel spindles and below the body. In these machines also the beater was mounted on an axis considerably in the rear of the axis of the wheels, and was supported upon the side boards or the light frame work of the body. It was found that the cranking, or bending downward, of the axle, itself, introduced difficulties that made this design very objectionable. The metallic axle, if alone depended on, had to be large and heavy so as to have sufficient metal to overcome its tendency to bend and twist out of shape under the strains of heavy, wet loads of manure, and when moving across the furrowed, irregular fields; in fact, so large and heavy that it was found that this design was not practicable. Then it was proposed to strengthen the axle by means of a brace arch of metal extending from one wrist part of the axle or spindle, first upward, then across the body, above its top, and then downward to the other spindle or wrist part. But it was found that this bracing arch had to be extended to high horizontal lines or else it impeded the backward movement of the load, and was also found that it had to be made heavy in order to be strong enough to withstand the tortional twists and strains that were imparted by the body and its load to the downwardly drooped part.

Of the third class of mechanisms above referred to, each had its axle carried straight through from one wheel to the other and had the beater mounted directly thereon. In many respects this has been demonstrated to be the superior form of spreader.

The axle can be light and yet give a bracing support for the wheels, the body and the beater. The feeding apron at the bottom of the body can be placed low, near the surface of the ground, and the side walls correspondingly lowered so that the labor in lifting the material into the vehicle while it is being loaded is greatly reduced.

It has been proposed to modify structures of this sort by having the axis of the beater somewhat eccentric to the axis of the wheels, and my present improvements relate to mechanisms of this sub-class, that is, those in which the beater is mounted eccentrically, though rotating around the axis of the wheels.

One end that I wish to attain is to have the parts so arranged that the wheel base, instead of being fixed, can be varied to some extent to meet different conditions. Again, in the earlier low down spreaders, the bottom apron is rigidly held in relation to the wheel axis and at the same distance from the ground surface. This I have found is not desirable under all circumstances.

I retain a great part of the advantage characteristic of the structures in which the beater, whether concentrically or eccentrically mounted, revolves around the wheel axis, particularly as concerns relieving the vehicle body and the latter parts of the frame work from strains and stresses caused by the rapid movements of the beater when at work; for although the beater axis in my construction is adjustable through a long arc and is eccentric to the axis it is practically mounted upon the latter and upon the wheels.

The metallic bearing plates 9 rest directly on the axle, and the bearings at 18 being sufficiently long to eliminate serious vibrations, the axis of the beater is held steadily in parallelism with that of the axle and the wheels. When the beater is in the position shown in Fig. 5 it rests directly on the axle and wheels and its weight and the strain of the work are transmitted to them practically entirely. And as the shorter arms of the plates 9 carry the bearings which are fitted to the axle, the jars and strains transmitted from the beater to the body through the longer arms are practically reduced to nothing, even when the beater is otherwise adjusted, for example, as in Fig. 1.

But in whatever adjustment it is placed it prevents the load from abutting against or being stopped by the axle when it (the load) is being moved backward by the apron. For the beater is so positioned that its working fingers or operative parts are on the front side of the axle, that is the fingers or parts which are picking up the portions of the manure that are at the rear end of the load prior to throwing them backward over the axle.

It will be understood that there is no attempt to illustrate or describe the well known adjunct parts of these spreading mechanisms. The builder can combine with the parts shown any others that he prefers. Thus, in some spreaders backing ratchets are interposed between the ground wheels, or the axle, and the transmission gear; in others use is made of manually operated clutches for throwing the gear out of or into action; and any suitable form of locking ratchets or clutches can be employed. The movable feeder apron or conveyer F can be driven from the beater or from any other prime mover in the mechanism either by a train of gearing or by an intermittingly acting pawl-and-ratchet mechanism.

As stated, I prefer to combine with the feeder apron and with the beater an adjusting mechanism which will vary, in unison, the position of both in relation to the axle or to the ground; but they can be independently adjusted if desired in order that the beater may be thrown to one position and the feeder apron to another, whereby materials differing from each other can be differently handled.

In some territories a given farm or plantation will be partly level and partly on hillsides. In another case one part of the land will be evenly surfaced or unobstructed, while another part will have stones, rocks or stumps projecting.

The mechanism embodying my improvements is intended to meet these varying conditions, both for the advantage of the manufacturer and for the advantage of the farmer.

The manufacturer can make all of his machines standard duplicates and supply them for all territories. If in territories such as referred to, in any given case the land is level and unobstructed throughout, the parts of the machine can, at the outset, be put in the best adjustment appropriate for the land, and be allowed to remain there permanently. Or, if the conditions to which any particular machine is subjected vary from time to time, its parts can at one time be adjusted to meet one set of circumstances and at other times differently adjusted to meet another set. Where adjustment is required infrequently, the details shown (the bearing bars 9, the detachable bolts 10, etc.) will meet the requirements; but if adjustment is frequently desired the mounting elements which support the body and the beater on the axle can be shifted by a system of parts extending to the driver's seat, typified by such as will be described below.

An important factor in the successful operation of manure spreaders of this general class is the tractive efficiency of the rear ground wheels. They have to not only support more or less of the vehicle and its load, but they have to also impart power to the beater and the feeding mechanism. And at times the demand of power for these purposes is very great. In a structure like that shown, the beater element defines the position of the rear end of the load, and the beater being around the axle or near it, prevents the load from extending to the rear of the latter. The tractive efficiency of the wheels depends upon the amount of the weight bearing upon them.

As the distance between the axes of the rear wheels and of the front wheels (the length of the wheel base) increases, more and more of the weight of the load is taken off of the rear wheels and their tractive efficiency is reduced. As noted, the position of the rear beater relatively to that of the rear axle throws the rear end of the load to points in front of that axle. Consequently, as will be seen, if the position of the axle of the front wheels be fixed and also the quantity of the load, the tractive efficiency of the rear wheels will vary with the position of the beater and the weight of the load.

On the other hand, it is desirable that at the time the horses commence their starting effort to draw the load the weight on the rear wheels should be relatively reduced. If wet, heavy, material constitutes the load, the beater can be adjusted so as to lengthen the wheel base; but if the machine is loaded with light material the parts can be so adjusted as to shorten the base and increase the traction of the wheels.

Spreader mechanism embodying the improvements which I have described can be utilized to meet the varying conditions and weights of the load materials and also any variations in the land conditions incident to the localities where the machine is used.

Another important matter in my mechanism is the construction of the beater drum, proper, the devices for supporting it, and the means for transmitting power to the rotary part. As made heretofore, these beaters or distributers have been constructed with a central rotary shaft element (either solid or hollow) together with two or three rotary spiders, or sets of spoke arms, which arms at their outer ends are secured to the peripheral finger-carrying part, and at their inner ends are secured either to the shaft, directly, or to hubs, which, in turn, are fastened to, and rotate with, the shaft.

These beater drums are subjected to severe tangential strains in overcoming the resistance to their rotation as well as the severe strains, thrusts, and vibrations, above referred to, on lines which are transverse to the machine or parallel to the axis. And when the rotary spoke systems for supporting the periphery are employed, with relatively long arms extending from points near the periphery to points near the axle, the fracturing leverage at the periphery is so great that breakage frequently occurs.

In my construction, I apply the power for rotation at points near the working fingers where the resistance is met. My spiders or spoke systems are non-rotary; they simply provide a radially expanded bearing or journaling for the rotary part at the periphery.

The rotary part of the distributer, indeed, may be regarded as merely a series of sets of fertilizer engaging fingers which are arranged approximately uniformly around a common axis, and a carrier for these fingers, which, in this case, extends only a relatively short distance from the circles of rotation of the fingers inward toward their axis, leaving a large interior space or chamber for holding the devices which support and brace the rotary carrier.

In Figs. 7, 8 and 9 I have shown a modified form of the mechanism. Here the adjustment of the body mechanism and parts connected thereto can be effected from the front end of the machine and the latter can be adjusted vertically simultaneously with the rear end.

Many of the parts in this machine are similar to those in the construction in Figs. 1 to 6 and need not be again described in detail. X, X indicate front wheels; the rear wheels W, W, the body B, the side walls C, the feeder apron F, the beater S and its driving mechanism, being the same as above described.

The bars 9, however, instead of being adapted for direct connection to the side walls C, C, are formed integrally with or connected to rings 20, 20, which are rotatably mounted in circular bearing apertures in the side walls. Each ring is formed at its outer edges with a sheave 21 for a rope or cable. The supporting and driving mechanism for the beater is the same as that before described and the description need not be repeated.

The front end of the body is carried upward as indicated at K and is supported on the wheels X, X, by means of the bracket 22. This bracket is formed at its ends with two parallel upstanding parts 23, 23, and its lower central part is carried downward and is connected with the front axle in such a way as to permit the axle to be turned.

The parts 23, 23 of the bracket 22 are provided near their upper ends with gear teeth 24 which mesh with pinions 25, 25 on a transverse shaft 26. This shaft 26 is mounted on suitable bearings on the body. Mounted on the shaft 26 are two rope sheaves or drums 27, 27. To each of the drums 27 there is connected a rope or cable 28 which extends rearward and is connected to the corresponding sheaves 21 of the beater mechanism.

A crank 29 is provided for turning the shaft 26. When the crank 29 is turned, the pinions 25, 25, because of their engagement with the teeth 24 on the parts 23, 23, will cause the front end of the body to be raised or lowered according to the direction of rotation. It will furthermore be seen that by reason of the connection between the sheaves 27, 27, and the sheaves 21, 21, the latter sheaves, when the crank is turned, will be rotated and raise or lower the rear end of the body and change its position with respect to the axle. The parts are so related that the operator, by turning the crank, can cause the whole vehicle to be evenly raised or lowered as he may desire.

30, 30 are ratchet wheels on the shaft 26 and these are engaged by pawls 31, 31. By this means the parts can be held in adjusted position.

To prevent the beater and the parts connected therewith from being moved too far around the axis of the wheels, stationary stops such as shown at 32, 33, can be used, which in conjunction with a stop 34 carried by the adjustable parts will limit the movement of the latter.

When the machine is made in the way last described the body can be lowered at the time of loading, the workmen being relieved of much of the lifting necessitated at that time; and then either during the transportation or at the time when the unloading is to be effected it can be again raised to such position as is found desirable to meet the circumstances and the conditions of the ground surface, as above described.

What I claim is:

1. In a fertilizer distributer, the combination of the rear ground wheels, the through axle carrying said wheels, the rotary beater arranged to rotate around the said axle, means for transmitting power from the ground wheels to the beater, the feeder carrying the material to the beater, and the load-carrying body adjustable bodily vertically relatively to the wheel axle.

2. In a fertilizer distributer, the combination of the rear ground wheels, the rotary beater, the feeder for carrying the material backward to the beater, and the load-carrying body adjustable longitudinally relatively to the axis of the rear ground wheels and in vertical planes transverse to said axis.

3. In a fertilizer distributer, the combination of the rear ground wheels, the through axle, the load-carrying body mounted adjustably vertically on the said wheels, the beater arranged to rotate around the said axle, and the feeder for carrying the material backward on lines in the plane of the wheel axis, said beater being bodily adjustable vertically relatively to the axle.

4. In a fertilizer distributer, the combination of the rear ground wheels, the load-carrying body supported adjustably vertically on the said wheels, the feeder for carrying the material backward longitudinally of the body, and the rotary beater bodily adjustable longitudinally of the machine in relation to the wheel axis.

5. In a fertilizer distributer, the combination of the rear ground wheels, the body supported adjustably vertically on the said wheels, the feeder for carrying the material backward longitudinally of the body, and the rotary beater bodily adjustable both vertically relatively to the wheel axis and longitudinally of the machine.

6. In a fertilizer distributer, the combination of the rear ground wheels, the load-carrying body, the rotary beater, and the feeder for carrying the material to the beater and arranged to be bodily adjusted vertically from one plane to another of differing distances from the wheel axis.

7. In a fertilizer distributer, the combination of the rear ground wheels, the load-carrying body, the rotary beater, and the feeder bodily adjustable both vertically and longitudinally relatively to the wheel axis.

8. In a fertilizer distributer, the combination of the rear ground wheels, the load-carrying body, the backward moving feeder and the rotary beater, the feeder being vertically adjustable from an operating plane at one distance from the wheel axis to another operating plane, at another distance from the wheel axis and the beater being adjustable with the feeder.

9. In a fertilizer distributer, the combination of the rear ground wheels, the load-carrying body, the backward moving feeder bodily adjustable on the longitudinal lines of the body, and the rotary beater bodily adjustable vertically in relation to the wheel axis.

10. In a fertilizer distributer, the combination of the rear ground wheels, the load-carrying body, the backward moving feeder bodily adjustable relatively to the wheels on the longitudinal lines of the body, and the rotary beater bodily adjustable on said lines relatively to the wheels.

11. In a fertilizer distributer, the combination of the rear ground wheels, the load-carrying body, the backward moving feeder, and the rotary beater, said feeder and beater being mounted in fixed relations to each other and both vertically adjustable in approximately horizontal parallelism in relation to the axis of said wheels.

12. In a fertilizer distributer, the combination of the rear ground wheels, the load-carrying body, the backward moving feeder, and the rotary beater, said feeder and beater being mounted in fixed relations to each other, and bodily adjustable simultaneously on the longitudinal lines of the body relatively to the wheels.

13. In a fertilizer distributer, the combination of the rear ground wheels, the load-carrying body, the backward moving feeder, and the rotary beater, said feeder and beater being mounted in fixed relations with each other, and both being bodily adjustable simultaneously, both vertically and longitudinally relatively to the wheels.

14. In a fertilizer distributer, the combination of the load-carrying body, the power transmitting ground wheels, a rotary beater supported by the body on an axis which is fixed relatively thereto but adjustable relatively to the axis of the said ground wheels, and a train of beater-driving gear wheels, extending from the ground wheel axis to the beater, each wheel of the said train being permanently positioned at a fixed distance from said axis and remaining permanently in operative connection with the next wheel of the train.

15. In a fertilizer distributer, the combination of the load-carrying body, the power transmitting ground wheels, a rotary beater arranged to operate around the axis of the ground wheels and adjustable in relation to said axis, a train of gearing commencing with a gear driven by a ground wheel and extending to gearing on the beater, all the gears of the said train remaining permanently in operative connection and the gears of the train adjacent the beater being adjustable therewith from one fertilizer-delivering position to another.

16. In a fertilizer distributer, the combination of the load-carrying body, the power transmitting traction ground wheels, a rotary beater arranged to operate around the axle, and a train of traction-driven beater-driving gear wheels held permanently in operative engagement with each other, the said beater and those gear wheels adjacent the beater being adjustable in fixed relations with each other and, while maintained in the said engagement, from one fertilizer delivering position to another relatively to the ground wheel axis.

17. In a fertilizer distributer, the combination of the front wheels, the rear ground wheels adapted to transmit power, the beater, the body vertically adjustable relatively to the said wheels, the feeder carrying the material in the body to the beater, means for transmitting power from the ground wheels to the beater and the feeder, and means for adjusting the body vertically while the power transmitting devices are in operative positions.

18. In a fertilizer distributer, the combination of the front wheels, the rear wheels, the rotary beater, the feeder carrying the material to the beater, means for transmitting power to the beater and to the feeder, the body carrying the feeder and said power-transmitting means, and means for vertically adjusting the body and the feeder and for simultaneously adjusting the beater relatively to the axis of the rear ground wheels.

19. In a fertilizer distributer, the combination of the front wheels, the rear ground wheels adapted to transmit power, the rotary beater, the feeder for carrying material to the beater, the body supported on the said wheels, means for transmitting power from the ground wheel to the feeder and the beater, means for vertically adjusting the body relatively to the rear wheels while the power transmitting devices are in operative positions, and means for locking the vertically adjustable parts in either of several positions.

20. In a fertilizer distributer, the combination of the body, the front ground wheels, the rear ground wheels, means for varying the length of the wheel base, the rotary beater, and means for delivering the material of the load to the beater.

21. In a fertilizer distributer, the combination of the body, the rear ground wheels, the front ground wheels, means for varying the distance from the axis of the rear wheels to the front wheels, the rotary beater, and means in the body for delivering the material of the load to the beater.

22. In a fertilizer distributer, the combination of the rear ground wheels, the rotary beater, the feeder carrying the material to the beater, the vertically adjustable body carrying the feeder and the load thereon and supported on the said wheels, and means for lowering the body to positions near the ground to permit the initial loading thereof on low horizontal planes and for lifting the load and the body relatively to the wheels to relatively high planes to permit distribution of the material by the beater from said high planes to the rear of the machine, substantially as set forth.

23. In a fertilizer distributer, the combination of a load-carrying body, the rear ground wheels, a distributing element which is supported upon one axis and rotates around an axis eccentric thereto and comprising sets of fertilizer engaging fingers rotatable around said second axis, and a carrier for said fingers extending a relatively short distance from their circles of rotation inward toward their axis, a relatively stationary support for said carrier engaging with it at points remote from its axis, and a train of power transmitting devices extending from and receiving power at the axis of support and arranged to rotate the carrier and engage with it at points remote from its axis.

24. In a fertilizer distributer, the combination of the ground wheels, the body, the distributing element which is supported at the axis of the ground wheels and is bodily adjustable in relation thereto and comprises sets of fertilizer engaging fingers rotatable around a common axis which is eccentric to the wheel axis, a rotary carrier for said fingers extending a relatively short distance from their circles of rotation inward toward their axis, a relatively stationary support for said tooth carrier engaging with it at points remote from the axis, a toothed gear wheel on the axis of the drive wheels, and a train of transmitting toothed gear wheels extending from the aforesaid wheel to and engaging with the finger carrier and arranged to remain in operative connection throughout said train in all positions of the carrier.

In testimony whereof, I have affixed my signature, in presence of two witnesses.

RICHARD N. MILET.

Witnesses:
 GEO. W. DUKE,
 S. C. MILLS.

Copies of this patent may be obtained for five cents each, by addressing the "Commissioner of Patents, Washington, D. C."